United States Patent
Flynn (10) Patent No.: US 7,250,853 B2
(45) Date of Patent: Jul. 31, 2007

(54) SURVEILLANCE SYSTEM

(75) Inventor: Daniel J. Flynn, Cocoa Beach, FL (US)

(73) Assignee: Honeywell International Inc., Morristown, NJ (US)

( * ) Notice: Subject to any disclaimer, the term of this patent is extended or adjusted under 35 U.S.C. 154(b) by 242 days.

(21) Appl. No.: 11/010,557

(22) Filed: Dec. 10, 2004

(65) Prior Publication Data

US 2006/0139162 A1 Jun. 29, 2006

(51) Int. Cl.
*G08B 29/00* (2006.01)

(52) U.S. Cl. .................. 340/506; 340/5.81; 340/541; 340/551; 340/572.1; 340/573.1; 348/159; 348/211.8

(58) Field of Classification Search ............... 340/906, 340/541, 551, 552, 553, 554, 555, 556, 557, 340/561, 573.1, 506, 565, 572.1, 5.81; 348/159, 348/211.8, 42, 207.1; 250/221
See application file for complete search history.

(56) References Cited

U.S. PATENT DOCUMENTS

| | | | |
|---|---|---|---|
| 4,717,915 A | 1/1988 | Goede | |
| 5,935,190 A | 8/1999 | Davis et al. | |
| 6,118,401 A | 9/2000 | Tognazzini | |
| 6,359,647 B1 * | 3/2002 | Sengupta et al. | 348/154 |
| 6,693,530 B1 * | 2/2004 | Dowens et al. | 340/506 |
| 6,970,086 B2 * | 11/2005 | Nelson | 340/551 |
| 6,998,987 B2 * | 2/2006 | Lin | 340/573.1 |
| 7,068,166 B2 * | 6/2006 | Shibata et al. | 340/541 |

* cited by examiner

*Primary Examiner*—Davetta W. Goins
(74) *Attorney, Agent, or Firm*—Fogg & Powers LLC (57) ABSTRACT

A surveillance system is provided. The system includes at least one target detection sensor, a plurality of adjustable identification sensors and a system controller. The syste controller is coupled to the at least one target detection sensor and the plurality of adjustable identification sensors. The system controller processes data from the plurality of target detection sensors, applies threat criteria, and, when a target is identified as a threat, the system controller selects at least one of the plurality of adjustable identification sensors and adjusts a sensing input of the selected one of the plurality of adjustable identification sensors to capture information on the identified target. The system also includes a monitoring station that is adapted to receive signals from the selected one of the adjustable identification sensors and to display the captured information.

37 Claims, 5 Drawing Sheets

SURVEILLANCE SYSTEM

BACKGROUND

Beginning with the terrorist attacks of Sep. 11, 2001, providing cost effective security measures at various high-profile installations increased in importance. Installations such as seaports, airports, chemical plants, nuclear reactors, military and other sensitive installations are vulnerable to terrorist attacks. Unfortunately, the state of the art systems for securing such installations can be very costly to install both in terms of money and in terms of time.

Some existing systems that can be used to secure such installations include the use of radar to detect intruders. Unfortunately, technicians require extensive training to be able to effectively use radar systems. Further, such systems are prone to false alarms that trigger personnel to investigate a potential incident. This reduces the effectiveness of a conventional radar-based surveillance system.

Commonly, other surveillance systems use video cameras to secure an area. These systems rely heavily on operators to view data presented on monitors. The larger the installation under surveillance, the more cameras and the more hence personnel are needed to operate the system effectively. A given operator can only be effective in viewing video feeds from a small number of video cameras. Further, the video cameras provide a large volume of data and thus this type of system requires an infrastructure with a large bandwidth to allow the operators to view the available data.

Therefore, a surveillance system is needed that enables securing an installation with reduced installation, maintenance and operational costs.

SUMMARY

Embodiments of the present invention overcome problems with existing surveillance systems. In one embodiment, a surveillance system is provided. The system includes at least one target detection sensor, a plurality of adjustable identification sensors and a system controller. The syste controller is coupled to the at least one target detection sensor and the plurality of adjustable identification sensors. The system controller processes data from the plurality of target detection sensors, applies threat criteria, and, when a target is identified as a threat, the system controller selects at least one of the plurality of adjustable identification sensors and adjusts a sensing input of the selected one of the plurality of adjustable identification sensors to capture information on the identified target. The system also includes a monitoring station that is adapted to receive signals from the selected one of the adjustable identification sensors and to display the captured information.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide improved surveillance capability over traditional surveillance systems by leveraging the capabilities of one type of sensor to control the use of another type of sensor. In one embodiment, a surveillance system uses radar to detect a target and then gathers additional information on the target by steering an adjustable camera to capture video images of the target based on the information gathered by the radar. In one embodiment, the surveillance system also leverages existing systems, e.g., automatic identification systems that broadcast identification information by potential targets, to assist in selecting targets to monitor with the adjustable camera.

Figure 1:
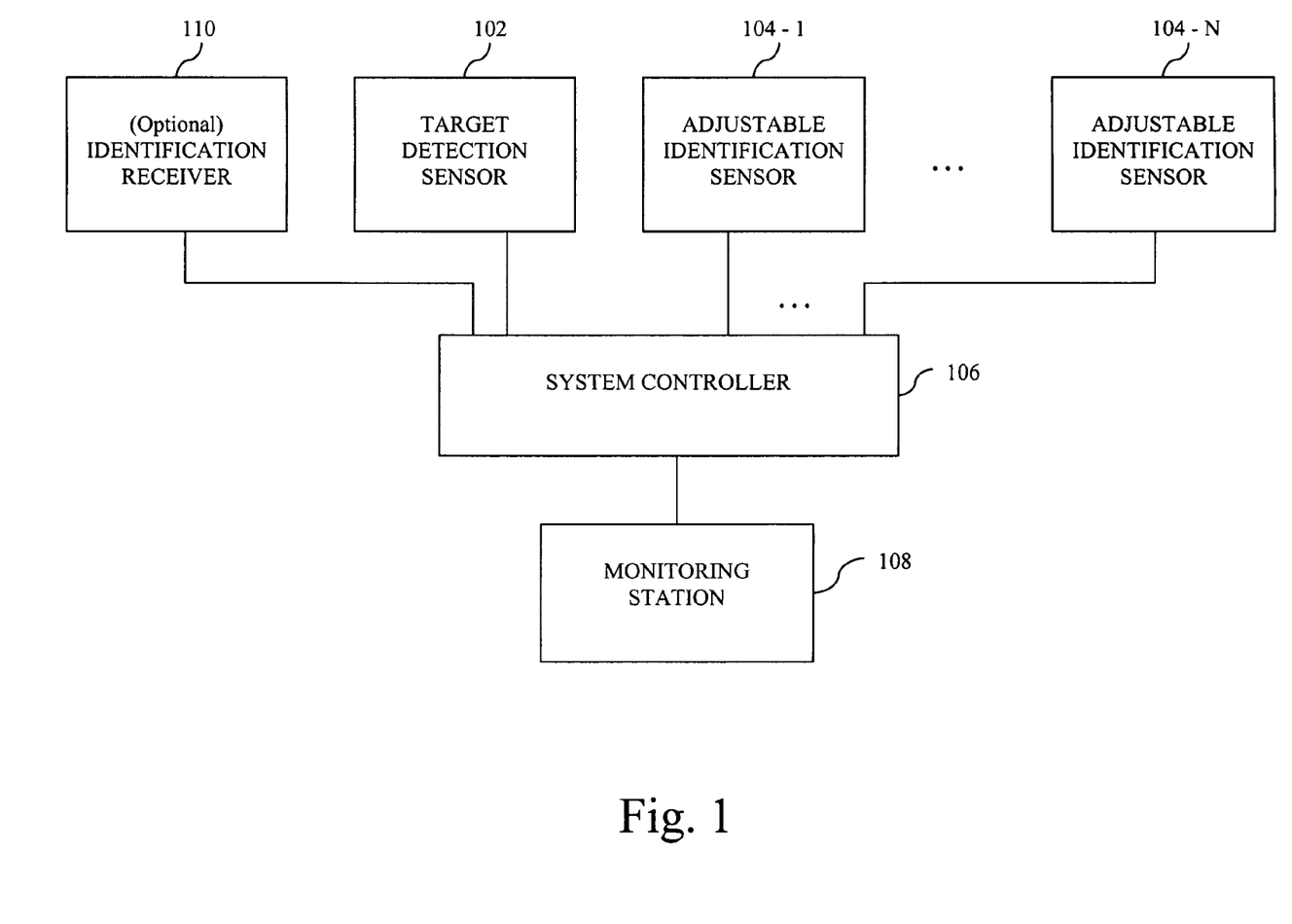
FIG. 1 is a block diagram of one embodiment of a surveillance system according to the teachings of the present invention.

FIG. 1 is a block diagram of one embodiment of a surveillance system, indicated generally at 100, according to the teachings of the present invention. System 100 uses two types of sensors to provide improved surveillance over existing systems. For example, system 100 uses target detection sensors 102 and adjustable identification sensors 104-1, . . . , 104-N. Each of these sensors is discussed in more detail below. Essentially, system 100 uses target detection sensors 102 to acquire a target and then uses adjustable identification sensors 104, . . . , 104N to capture additional information about the targets.

System 100 identifies targets within a guard zone using target detection sensor 102. The guard zone is an area that is covered by system 100. This guard zone is an area that is monitored by system 100. In one embodiment, the guard zone is associated with any appropriate type of installation, e.g., a sea port, air port, manufacturing facility, chemical plant, power plant, military base, government building, financial institution, or other facility or location that is desired to be protected from attack or unauthorized intrusion.

In one embodiment, target detection sensor 102 comprises a radar sensor that is disposed in a location that enables the radar sensor to detect targets that enter the guard zone or a selected portion thereof. In other embodiments, target detection sensor 102 comprises one or more of sonar, acoustic and optical detection sensors that are similarly positioned relative to the guard zone. The number of target detection sensors 102 used in a particular application is determined by the size and shape of the guard zone as well as the particular capabilities of the target detection sensor. Target detection sensor 102, in one embodiment, comprises a sensor that is adapted to precisely detect targets as small as 2 square meters and at distances of up to several miles. Target detection sensor 102 provides excellent detection capabilities but does not need to provide classification and identification capabilities.

System 100 also includes a plurality of adjustable identification sensors 104-1, . . . , 104-N that provide classification and identification functions for system 100. The exact number of adjustable sensors 104-1, . . . , 104-N depends on the particular application, the area to be covered, and the volume of potential targets expected to pass through the guard zone. In one embodiment, the adjustable sensors 104-1, . . . , 104-N comprise adjustable video cameras, thermal imaging cameras, night vision cameras, and parabolic listening devices. The adjustable identification sensors 104-1, . . . , 104-N capture additional information on targets identified by target detection sensor 102.

System 100 coordinates the use of target detection sensor 102 and adjustable identification sensors 104-1, . . . , 104-N through system controller 106. System controller 106 is coupled to target detection sensor 102 and adjustable identification sensors 104-1, . . . , 104-N over a communication network. In one embodiment, the communication network comprises a TCP/IP network. In one embodiment, the communication network is a wireless network. Advantageously, the use of a wireless network reduces the installation cost of system 100. It is noted, however, that system 100 is not limited to use with wireless networks. System 100, in some embodiments, uses wired networks, e.g., coaxial cable, twisted pair, copper cable, fiber optic cable or other appropriate media for carrying data between the system controller 106 and the target detection sensor 102 and adjustable identification sensors 104-1, . . . , 104-N.

System 100 provides an output to an operator at monitoring station 108. In one embodiment, monitoring station 108 comprises one or more video consoles. In other embodiments, monitoring station 108 also includes audio speakers to present audio messages to the operator. In one embodiment, the monitoring station 108 includes a graphical user interface that provides a display of the output from target detection sensor 102 and adjustable identification sensors 104-1, . . . , 104-N.

Monitoring station 108 also provides an input for an operator to configure some of the settings of system 100. For example, in one embodiment, monitoring station 108 enables the operator to define the boundaries of the guard zone monitored by system 100. Further, in one embodiment, the graphical user interface enables the operator to adjust the guard zone by moving boundaries on the graphical display on the monitoring station 108, e.g., with a point-and-click interface device. In one embodiment, monitoring station 108 enables the operator to establish criteria for identifying a target as a threat. Further, in one embodiment, monitoring station 108 enables the operator to establish prioritization criteria for determining how to handle the presence of simultaneous threats.

In one embodiment, the monitoring station 108 provides the operator with a list of criteria to use in establishing a prioritization scheme. For example, at a first level, monitoring station 108 allows the user to identify one or more alarm zones in the guard zone. Each alarm zone, in one embodiment, is assigned a selected priority level. In other embodiments, monitoring station 108 provides other selections for the operator to prioritize various targets, e.g., time of day, speed, size, direction, etc. The operator creates various levels of priority based on the available selections.

In one embodiment, system 100 also leverages information from other systems to provide improved surveillance operation. For example, in one embodiment, system 100 include optional receiver 110. Receiver 110 receives signals from transmitters on the targets that enter the guard zone. These signals provide information that identifies the target. In one embodiment, these signals are signals from vessels that comply with the Automatic Identification System (AIS) for sea-going vessels. In one embodiment, system controller 106 uses these signals to determine whether a target is a threat or not. Further, in one embodiment, the information from the AIS signals is overlaid on the images displayed on the monitoring station 108.

In operation, system controller 106 controls the operation of adjustable identification sensors 104-1, . . . , 104-N based on data received from target detection sensor 102. In one embodiment, target detection sensor 102 detects a target that enters the guard zone. When the target is detected, target detection sensor 102 feeds this information to the system controller 106. The system controller 106 applies the threat criteria to determine whether the target is a threat. If so, the system controller 106 generates an alarm for display on the monitoring station 108. Further, the system controller 106 generates signals to control a selected one of the adjustable identification sensors 104-1, . . . , 104-N, e.g., 104-1. In one embodiment, system controller 106 generates pan, tilt and zoom (PTZ) commands for the adjustable sensor 104-1. These commands direct the adjustable identification sensor 104-1 to direct a sensing input at the target to gather more information, e.g., to capture video images of the target. The adjustable identification sensor 104-1 transmits the captured video signals back to the system controller 106 for display on the monitoring station 108.

Figure 2:
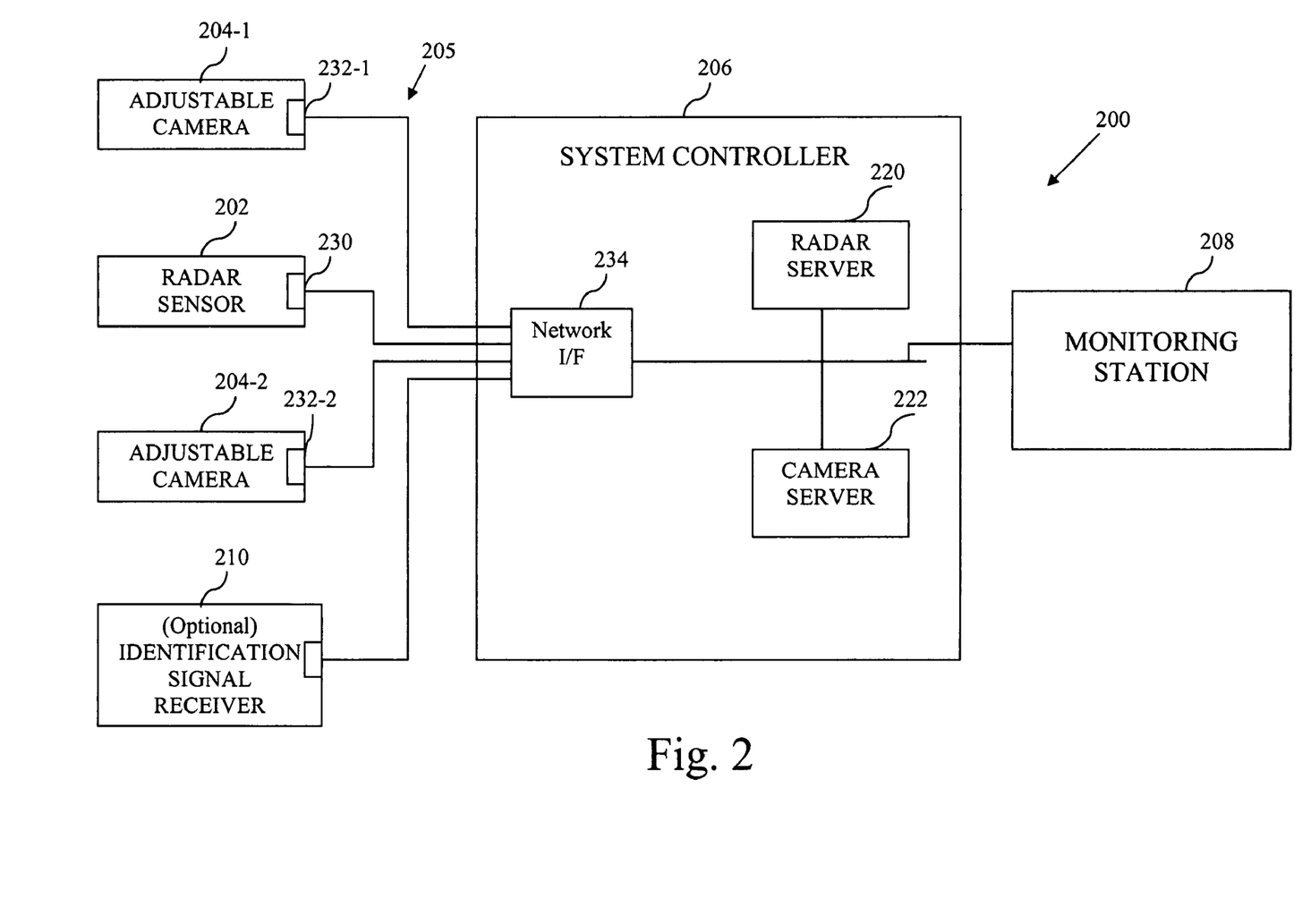
FIG. 2 is a block diagram of another embodiment of a surveillance system according to the teachings of the present invention.

FIG. 2 is a block diagram of another embodiment of a surveillance system, indicated generally at 200, according to the teachings of the present invention. System 200 uses two types of sensors: radar sensor 202 and adjustable cameras 204-1 and 204-2. In other embodiments, any appropriate number of radar sensors and adjustable cameras are used to cover a desired guard zone.

Radar sensor 202 detects when targets enter the guard zone. In one embodiment, radar sensor 202 comprises X-band marine radar sensors that provide coverage in a variety of weather conditions, e.g., rain, snow and heavy winds. Further, X-band radar is also advantageous because it is off-the-shelf equipment that is widely available. In one embodiment, the radar sensor 202 provides RS-422 raw data. In this case, radar sensor 202 also includes a converter, e.g., an Axis 2401 streamer, that converts the RS-422 data to TCP/IP packets for transmission to the system controller 206. This is not necessary when the radar sensor 202 produces TCP/IP compliant output data.

Adjustable cameras 204-1 and 204-2 capture additional information regarding targets identified by radar sensor 202. Adjustable cameras 204-1 and 204-2, in one embodiment, comprise steerable CCTV cameras such as KD6i cameras. Advantageously, by using steerable cameras in conjunction with radar, system 100 is able to provide coverage of a larger area with fewer cameras. Further, system 100 also provides visual identification of targets via the adjustable cameras 204-1 and 204-2. With visual identification, system 100 produces fewer false alarms compared to conventional radar only systems. As with the radar sensor, the adjustable cameras 204-1 and 204-2 include a converter that converts the RS-422 data to Ethernet packets for transmission to the system controller 206.

Radar sensor 202 and adjustable cameras 204-1 and 204-2 communicate with system controller 206 over network 205. In one embodiment, communication network 205 is a wired network, e.g., a local or wide area network based on Ethernet or other appropriate communication protocol. In other embodiments, communication network 205 comprises a wireless network. Radar sensor 202 and adjustable cameras 204-1 and 204-2 are fitted with network interface units 230, 232-1 and 232-2, respectively. When a wireless network is used, network interface units 230, 232-1 and 232-2 Trango 5830 subscriber units that communicate in the 5.8 GHz range with a 4 mile radius. In this embodiment, network interface 234 comprises a Trango 5830 wireless access point. Advantageously, when a wireless communication network is used, the costs associated with installation of network 100 are substantially reduced. Further, the configuration of system 100 is more flexible and the system controller can be made more portable.

System controller 206 includes two main components for processing signals from radar sensor 202 and adjustable cameras 204-1 and 204-2. Radar server 220 receives signals from radar sensor 202. In one embodiment, radar server 220 receives target data from radar server 202 in the form of tracked target messages (TTM). In one embodiment, the TTMs include target position, velocity, and heading. Radar server 220 ingests these messages for further processing. Radar server 220 uses the TTMs along with user defined threat criteria and time of day to determine whether the target is a threat. In one embodiment, radar server 220 also uses information from optional receiver 210 to determine whether the target is threat. In one embodiment, receiver 210 receives signals compliant with the Automatic Identification System standard that provide information on the identity of the target. If the target is a threat, the radar server generates an alarm for presentation at monitoring station 208. Further, radar server 220 creates pan, tilt and zoom (PTZ) settings using the target locations relative to the adjustable camera 204-1 or 204-2 being used to track the target. In one embodiment, the PTZ settings are used to look-up preset values in a table to control the adjustable camera.

Camera server 222 responds to signals from radar server 220 to control a selected adjustable camera 204-1 or 204-2. In one embodiment, camera server 222 passes the preset values to the appropriate adjustable camera when radar server 220 indicates that the adjustable camera is needed to capture additional information on a threat. Camera server 222 also controls the recording of video from the selected one of cameras 204-1 and 204-2. Further, camera server 222 also provides the video signal from the selected camera to monitoring station 208 for display to an operator.

Figure 3:
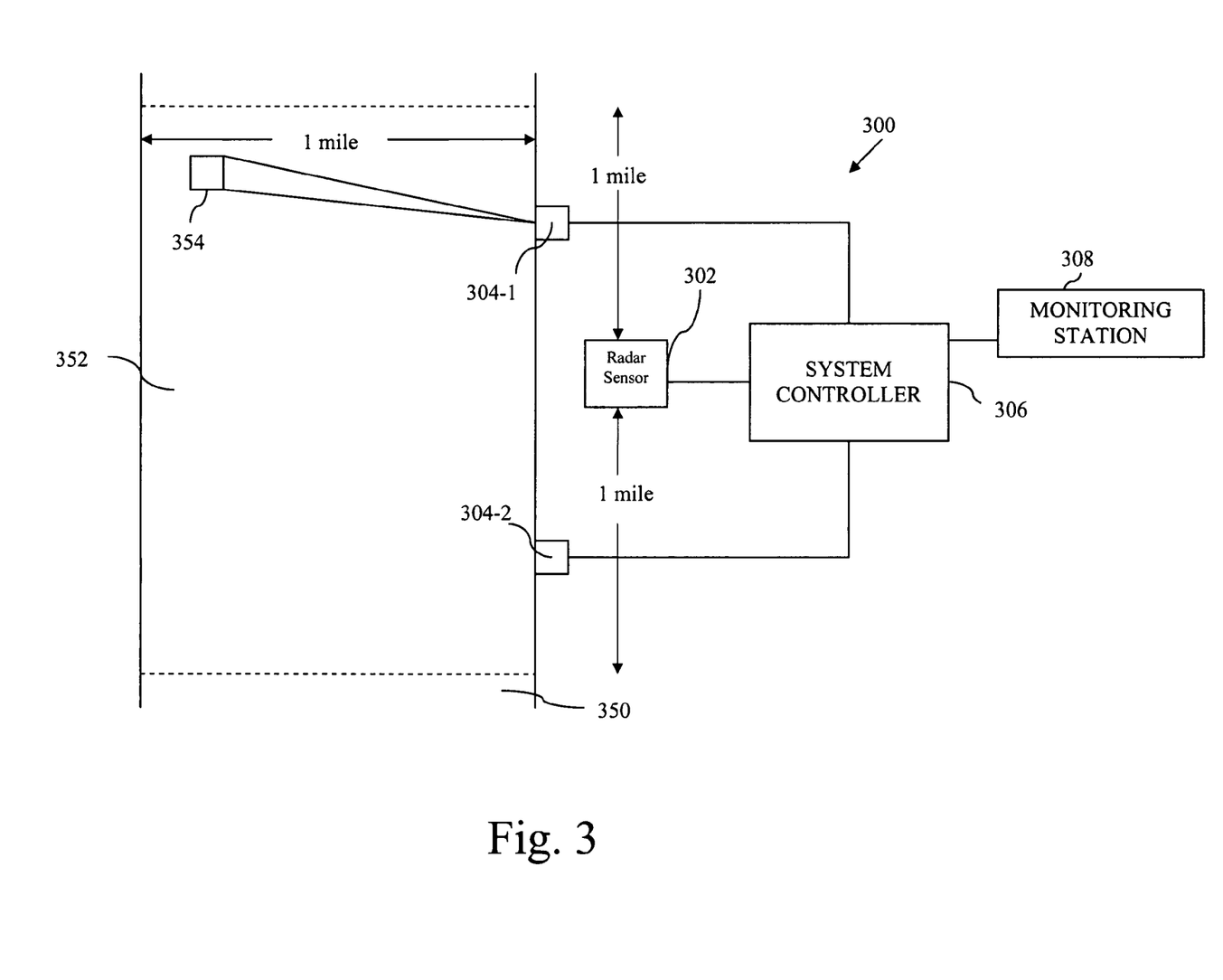
FIG. 3 is a graphical representation of an example of an installation with an embodiment of a surveillance system according to the teachings of the present invention.

FIG. 3 is a graphical representation of an example of an installation with an embodiment of a surveillance system, indicated generally at 300, according to the teachings of the present invention. System 300 is a surveillance system for a port on a river 350. System 300 includes a radar sensor 302 that is positioned at a midpoint on the port to define a guard area 352 that is two miles along the river 350. The system 300 also includes first and second adjustable cameras 304-1 and 304-2. Each camera in located half a mile from the radar sensor 302 and covers half of the guard area. In one embodiment, radar sensor 302 and adjustable cameras 304-1 and 304-2 are coupled to system controller 306 over a wireless communication network. In other embodiments, a wired network is used.

In operation, system 300 provides surveillance over the guard area 352. When a target enters the guard area, e.g., target 354, radar sensor 302 detects the presence of the target. Radar sensor 302 provides signals to system controller 306 to indicate the presence of the target 354. System controller then uses operator established criteria, e.g., time of day, speed and trajectory, to determine whether the target is a threat. If the target is a threat, the system controller 306 selects one of the adjustable cameras to obtain additional detail regarding the threat. In this case, system controller 306 determines that the target 354 is in the sector of the guard zone 352 covered by adjustable camera 304-1. Thus, system controller 306 generates control signals for adjustable camera 304-1 to direct the camera at the target 354 and to zoom in to an appropriate level to provide a visual identification of the target 354. System controller 306 then displays the images from adjustable camera 304-1 and an alarm on monitoring station 308.

Figure 4:
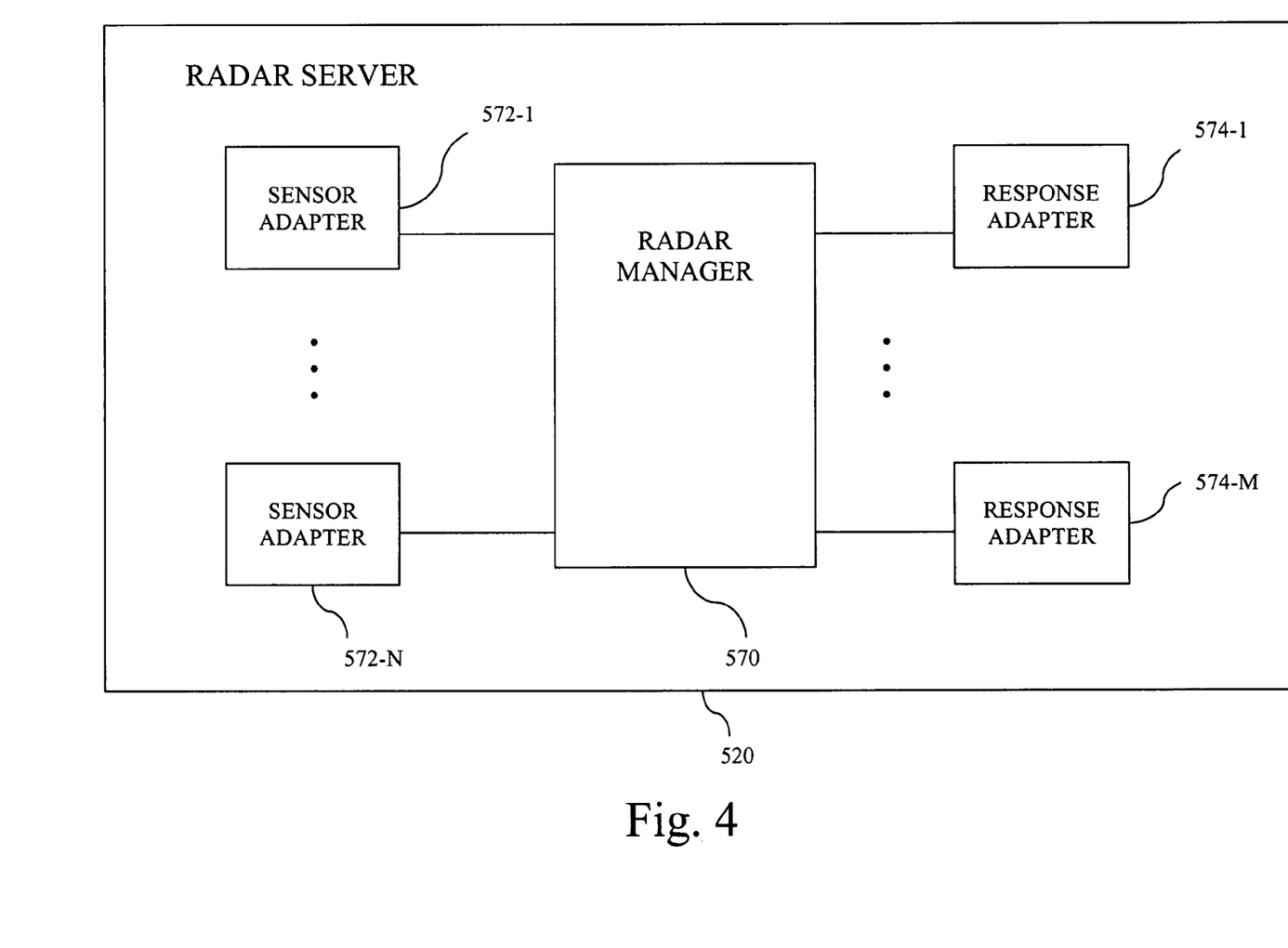
FIG. 4 is a block diagram of an embodiment of a radar server in a surveillance system according to the teachings of the present invention.

FIG. 4 is a block diagram of an embodiment of a radar server, indicated generally at 520, in a surveillance system according to the teachings of the present invention. Radar server 520 processes data from a plurality of sensors and generates a number of outputs. In this embodiment, radar server 520 includes radar manager 570 that performs the operations identified above with respect to radar server 220 of FIG. 2. In this embodiment, radar manager 570 performs its functions in a manner that is independent of the sensors and systems coupled to radar manager 570. Radar manager 570 accomplishes this through the use of adapters. Signals provided to each input of radar manager 570 are conditioned by an appropriate adapter 571-1 to 572-N. Each adapter is configured to accept data in a format native to the appropriate sensor and to convert the data to a standard format for radar manager 570. Similarly, radar manager 570 provides output signals in a format native to radar manager 570. Signals from radar manager 570 are conditioned for the appropriate device through response adapters 574-1 to 574-M. These adapters also convert signals from the format used by radar manager 570 to a format appropriate for the device coupled to the adapter. The number and types of specific adapters depends on the types of sensors and devices used with radar server 520.

Figure 5:
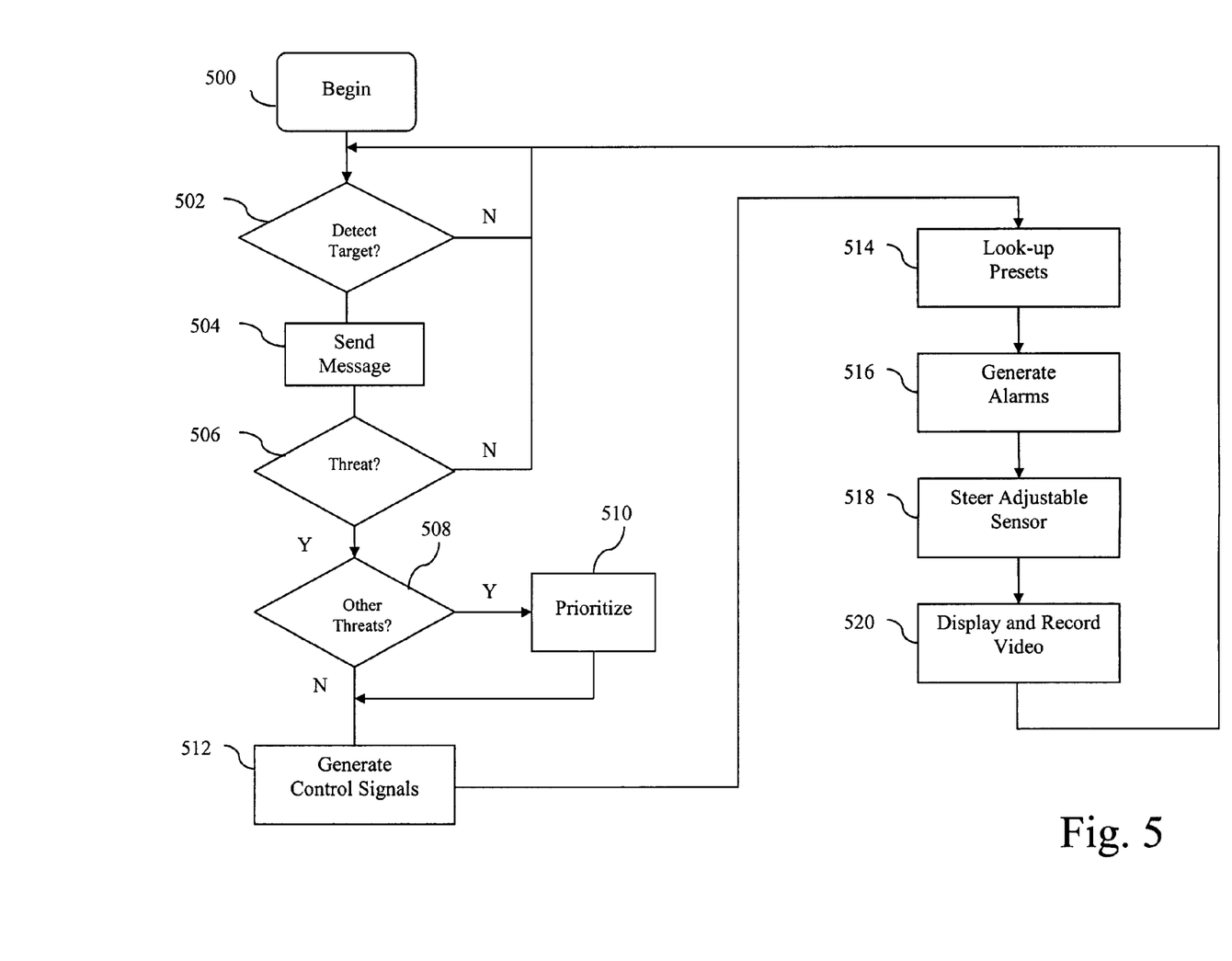
FIG. 5 is a flow chart of one embodiment of a process for a surveillance system according to the teachings of the present invention.

FIG. 5 is a flow chart of one embodiment of a process for a surveillance system according to the teachings of the present invention. The process begins at block 500. At block 502, the process determines whether a target has been detected. In one embodiment, the process accomplishes this through use of a radar sensor that is configured to detect targets in a guard zone. If the process does not detect a target, the process returns to block 502 to wait for a target to be detected. If, however, a target is detected at block 502, the process transmits messages at block 504 indicating that a target has been detected. In one embodiment, the messages are generated by the radar sensor and include the position, speed and trajectory of the target.

Once the target has been detected, the process determines whether additional information is required on the target. First, the process determines whether the target is a threat at block 506. In one embodiment, the process applies user configurable rules to determine whether the target is a threat. For example, the process uses information such as the position, trajectory, speed, time of day, and any other information regarding the target to determine whether the target is a threat. In one embodiment, the process uses self-identification signals to assist in determining whether the target is a threat. If the target is not a threat, the process returns to block 502.

If the target is a threat, in one embodiment, the process uses a prioritization algorithm to select one or more targets on which to gather further information. At block 508, the process determines whether there are other threats in the guard zone. If so, the process prioritizes the targets at block 510 based on user defined criteria such as location, speed and bearing. For example, a target that is traveling at a high speed may be given priority over a slower of stationary target.

Once the target is identified as a threat and prioritized (if appropriate), the process proceeds to gather additional information on the target with a second senor. At block 512, the process generates control signals for the additional sensor, e.g., pan, tilt and zoom (PTZ) signals. In one embodiment, the process looks-up preset settings for the additional sensor based on the generated control signals at block 514. In other embodiments, the raw control signals are passed to the additional sensor. At block 516, the process generates an alarm based on the detected threat. Further, the process controls the additional sensor to gather information on the target at block 518. In one embodiment, the process steers an adjustable camera and focuses its site on the target to gather video data. At block 520, the process displays the data from the additional sensor for the operator on a monitoring station. In one embodiment, the process displays the video signal from an adjustable camera. In one embodiment, self-identification signals received from the target are also displayed on the monitoring station.

What is claimed is:

1. A surveillance system, comprising:
   at least one target detection sensor;
   a plurality of adjustable identification sensors;
   a system controller, coupled to the at least one target detection sensor and the plurality of adjustable identification sensors, wherein the system controller processes data from the plurality of target detection sensors, applies threat criteria, and, when a target is identified as a threat, the system controller selects at least one of the plurality of adjustable identification sensors and adjusts a sensing input of the selected one of the plurality of adjustable identification sensors to capture information on the identified target; and
   a monitoring station adapted to receive signals from the selected one of the adjustable identification sensors and to display the captured information.

2. The system of claim 1, wherein the at least one target detection sensor comprises at least one of radar, sonar, acoustic and optical detection sensors.

3. The system of claim 1, wherein the plurality of adjustable identification sensors comprise at least one of video cameras, thermal imaging cameras, night vision cameras, and parabolic listening devices.

4. The system of claim 1, wherein the at least one target detection sensor and the plurality of adjustable identification sensors each include a wireless network interface to communicate with the system controller.

5. The system of claim 1, wherein the monitoring station includes a graphical user interface that is adapted to display information from the selected one of the plurality of adjustable sensing devices.

6. The system of claim 1, and further including a receiver, coupled to the system controller, that is adapted to receive identification signals from targets.

7. The system of claim 6, wherein the monitoring station is adapted to display information from the identification signals.

8. The system of claim 1, wherein:
   the plurality of adjustable identification sensors comprise adjustable cameras; and
   the system controller controls the pan, tilt and zoom of the adjustable cameras based on information from the at least one target detection sensor.

9. The system of claim 1, wherein the threat criteria comprise at least one of location, speed, bearing of the target and time of day.

10. The system of claim 1, wherein the system controller applies user configurable prioritization rules to prioritize among a plurality of simultaneous targets that are identified as threats.

11. A surveillance system for an installation, comprising:
    at least one radar sensor disposed in a location, the radar sensor is adapted to generate data that identifies targets relative to the installation;
    a plurality of adjustable cameras;
    a system controller, coupled to the at least one radar device and the plurality of adjustable cameras over a communication network, wherein the system controller includes:
       a radar server that processes data from the at least one radar sensor and applies threat criteria, and, when a target is identified as a threat, selects at least one of the plurality of adjustable cameras to acquire visual images of the threat and generates control signals for the selected one of the adjustable cameras; and
       a camera server that adjusts the selected one of the plurality of adjustable cameras based on the control signals generated by the radar server to capture visual images of the selected target and that controls recording of the visual images from the selected one of the plurality of adjustable cameras; and
    a monitoring station adapted to receive signals from the selected one of the plurality of adjustable cameras and displaying information based on the received signal.

12. The system of claim 11 and further including a receiver coupled to the system controller that is adapted to receive target identification data.

13. The system of claim 11, wherein the radar server uses the information from the receiver to determine whether a target is a threat.

14. The system of claim 11, wherein the radar server generates pan, tilt and zoom values for targets identified as threats.

15. The system of claim 14, wherein the radar server generates the control signals by looking up preset values based on the generated pan, tilt and zoom values.

16. The system of claim 11, wherein the radar server further generates an alarm when a threat is identified.

17. The system of claim 11, wherein the radar server includes:
    a radar manager that processes the data from the at least one radar sensor; and
    an adapter, coupled between the radar manager and the at least one radar sensor, that conditions the data for the radar manager.

18. The system of claim 11, wherein the radar server prioritizes between targets based on user configurable criteria.

19. A system controller for a surveillance system with at least one radar sensor and a plurality of adjustable cameras, the system controller comprises:
    a radar server that processes data from the at least one radar sensor and applies threat criteria, and, when a target is identified as a threat, selects at least one of the plurality of adjustable cameras to acquire visual images of the threat and generates control signals for the selected one of the adjustable cameras; and
    a camera server that adjusts the selected one of the plurality of adjustable cameras based on the control signals generated by the radar server to capture visual images of the selected target and that controls recording of the visual images from the selected one of the plurality of adjustable cameras.

20. A method for providing video surveillance, the method comprising:
  identifying a target in a guard zone with a target detection sensor having a long range detection capability;
  determining whether a detected target is a threat based on established threat criteria; and
  adjusting an adjustable sensor with classification and identification capability to gather additional information on the target.

21. The method of claim 20, and further comprising receiving input from an operator to define the guard zone.

22. The method of claim 20, wherein the target detection sensor generates tracked target messages when a target is identified in the guard zone.

23. The method of claim 20, and further receiving threat criteria from an operator.

24. The method of claim 20, and further comprising generating pan, zoom and tilt values for the adjustable sensor.

25. The method of claim 24, and further including looking up preset values for the adjustable sensor based on the generated pan, zoom, and tilt values.

26. The method of claim 20, wherein determining whether a detected target is a threat comprises analyzing location, speed, and bearing of the target and the time of day.

27. The method of claim 20, and further including receiving identification signals from the target.

28. The method of claim 27, and further using the identification signals to determine whether the target is a threat.

29. The method of claim 20, and further comprising prioritizing among multiple targets based on user selected criteria.

30. A method for controlling a video surveillance system, the method comprising:
  receiving messages from a detection sensor having a long range detection capability, the messages identifying a target;
  determining whether the target is a threat based on established threat criteria; and
  generating control signals to adjust an adjustable sensor with classification and identification capability to gather additional information on the threat.

31. The method of claim 30, and further including when more than one threat is identified, prioritizing between the identified threats based on configurable criteria.

32. The method of claim 30, wherein generating control signals includes looking up preset values in a look-up table.

33. A machine-readable medium having instruction stored thereon for a method for controlling a video surveillance system, the method comprising:
  receiving messages from a detection sensor having a long range detection capability, the messages identifying a target;
  determining whether the target is a threat based on established threat criteria; and
  generating control signals to adjust an adjustable sensor with classification and identification capability to gather additional information on the threat.

34. The machine-readable medium of claim 33, and further including when more than one threat is identified, prioritizing between the identified threats based on configurable criteria.

35. The machine-readable medium of claim 33, wherein generating control signals includes looking up preset values in a look-up table.

36. A method for deploying a video surveillance system, the method comprising:
  installing at least one detection sensor with high quality detection capability over a large area;
  determining a number of adjustable sensors with classification and identification capability needed to cover at least the same area as the at least one detection sensor;
  installing the number of adjustable sensors;
  establishing a monitoring station;
  establishing a communication link between the monitoring station and the at least one detection sensor and the adjustable sensors; and
  establishing threat and prioritization criteria for use in controlling the adjustable sensors to track targets identified by the at least one detection sensor.

37. An apparatus for controlling a video surveillance system, the apparatus comprising:
  means for receiving messages from a detection sensor having a long range detection capability, the messages identifying a target;
  means for determining whether the target is a threat based on established threat criteria; and
  means for generating control signals to adjust an adjustable sensor with classification and identification capability to gather additional information on the threat.

* * * * *

UNITED STATES PATENT AND TRADEMARK OFFICE
CERTIFICATE OF CORRECTION

| | | |
|---|---|---|
| PATENT NO. | : 7,250,853 B2 | Page 1 of 1 |
| APPLICATION NO. | : 11/010557 | |
| DATED | : July 31, 2007 | |
| INVENTOR(S) | : Flynn | |

It is certified that error appears in the above-identified patent and that said Letters Patent is hereby corrected as shown below:

On Title Page
Item 57, Line 3 Abstract, in the third line, please change "syste" to --system--

Signed and Sealed this

Twenty-seventh Day of November, 2007

JON W. DUDAS
*Director of the United States Patent and Trademark Office*